Sept. 16, 1958  A. E. WETHERBEE, JR., ET AL  2,851,879
ENGINE TEST STAND

Filed Jan. 13, 1955  2 Sheets-Sheet 1

INVENTORS
ARTHUR E. WETHERBEE JR.
RICHARD C. HURD

BY
ATTORNEYS

Sept. 16, 1958     A. E. WETHERBEE, JR., ET AL     2,851,879

ENGINE TEST STAND

Filed Jan. 13, 1955     2 Sheets-Sheet 2

INVENTORS
ARTHUR E. WETHERBEE, JR.
RICHARD C. HURD

BY

ATTORNEYS

United States Patent Office 2,851,879
Patented Sept. 16, 1958

2,851,879

ENGINE TEST STAND

Arthur E. Wetherbee, Jr., Newington, and Richard C. Hurd, Manchester, Conn., assignors, by mesne assignments, to the United States of America as represented by the Secretary of the Navy Application January 13, 1955, Serial No. 481,726

5 Claims. (Cl. 73—116)

This invention relates to apparatus for testing engines and more particularly relates to an apparatus to support an engine which generates thrust, the apparatus being of such nature that the true thrust of the engine may be measured.

Accordingly, an object of this invention is to provide an engine test stand which will support an engine and absorb a minimum amount of the thrust energy of the engine.

A further object is to provide an engine test stand having complete freedom of motion in an axial direction.

A still further object is to provide an engine test stand in which there is firm lateral and vertical restraint.

Yet another object of the invention is to provide an engine test stand which is inherently free of axial forces resulting from thermal expansion, warpage or eccentrically applied loads.

Another object of the invention is to provide an engine test stand wherein means are included to indicate when a true measurement is not obtained.

Other objects and many of the attendant advantages of this invention will be readily appreciated as the same becomes better understood by reference to the following detailed description when considered in connection with the accompanying drawings wherein.

Figure 1:
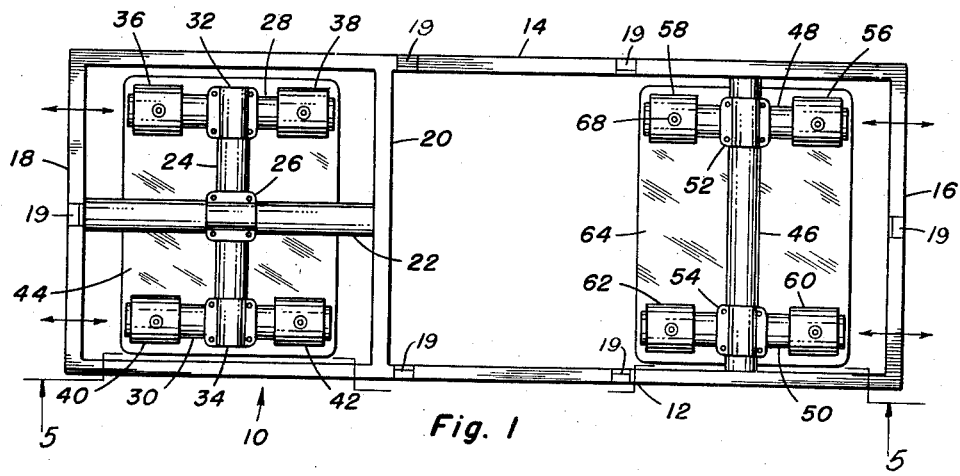
Fig. 1 is a plan view of an engine test stand made according to the invention.
Figure 5:
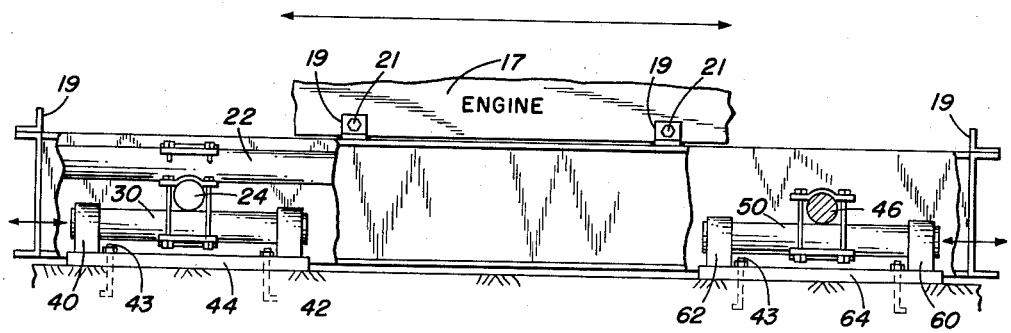
Fig. 5 is an elevation view of the engine test stand taken on line 5—5 of Fig. 1.

Referring now to the drawings, there is shown in Fig. 1 an engine support 10 in the form of a rectangular frame having side members 12 and 14 and end members 16 and 18. An intermediate member 20 extends transversely of the support 10 between side members 12 and 14, and is parallel to end members 16 and 18. Upon support 10 there may be mounted in any convenient manner, such as ears 19 and bolts 21, a thrust engine whose thrust is to be measured. The engine 17 exerts a thrust in the directions shown by the arrows in Fig. 5.

A longitudinal bar 22 is connected, as by welding, to end member 18 and intermediate member 20, and rests upon transverse support bar 24. Bar 22 may be joined to bar 24 by clamp means 26. Transverse bar 24 is connected to shafts 28 and 30 by clamp means 32 and 34, respectively. Shaft 28 is supported in bearings 36 and 38 and shaft 30 is supported in bearings 40 and 42. The four bearings 36, 38, 40 and 42 are supported by bearing supporting pad 44, which are anchored to a solid foundation by bolts 43. Preferably, bearing supporting pad 44 and bearings 36, 38, 40 and 42 are integrally cast. It will thus be seen that the weight of one end of support 10 is transferred to transverse support bar 24 at one point on said bar.

At the other end of engine support 10, a transverse bar 46 is connected to the two side members 12 and 14. Bar 46 rests on shafts 48 and 50, and is connected to them by clamps 52 and 54. Shaft 48 is supported in bearings 56 and 58 and shaft 50 is supported in bearings 60 and 62. The four bearings 56, 58, 60 and 62 are supported by bearing supporting pad 64, which also are anchored to a solid foundation by bolts 43. Bearing supporting pads 44 and 64, and their attendant bearings may be identical units. Thus, the weight of the other end of support 10 is transferred to transverse support bar 46 at two points on said bar. It can thus be seen that the shafts 28, 30, 48, and 50 have the support 10 fixed thereto and are free to move in the directions shown by the arrows in Figs. 1 and 5.

Figure 2:
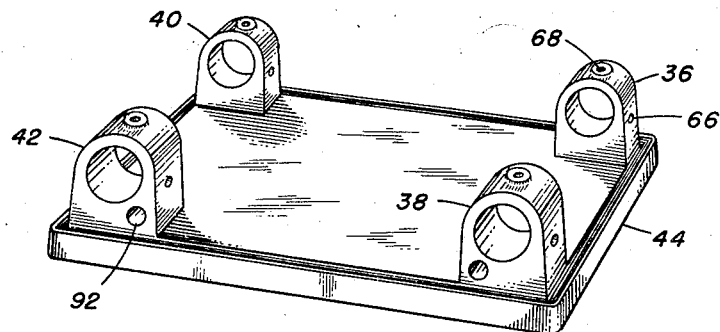
Fig. 2 is a perspective view of one of the two supporting pads.

In Fig. 2 there is shown a perspective view of bearing support pad 44, with bearings 36, 38, 40 and 42 thereon. As noted above, bearing support pad 64 may be identical to bearing support pad 44. As clearly shown in this view, bearings 36 and 38 are in axial alinement, as are bearings 40 and 42.

Figure 3:
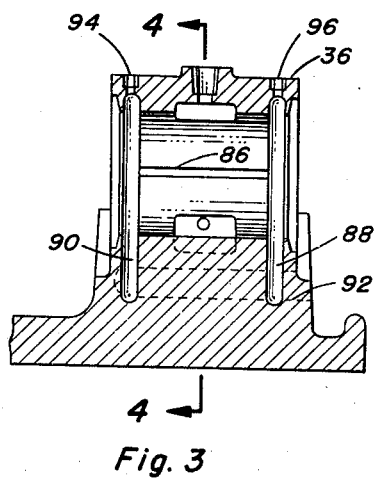
Fig. 3 is a cross-section of a bearing, taken on line 3—3 of Fig. 4.
Figure 4:
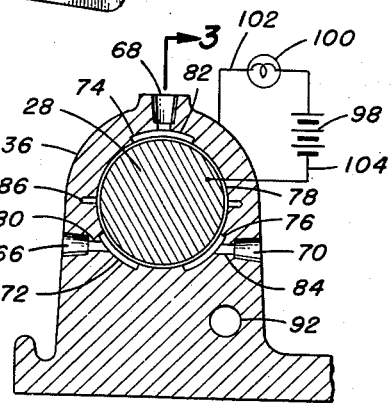
Fig. 4 is another cross-section of a bearing, taken on line 4—4 of Fig. 3.

In Fig. 3, there is shown a vertical axial section through bearing 36 taken on the line 3—3 of Fig. 4. Inasmuch as each of the bearings may be a unit identical to each of the other bearings, only one will be described. These bearings receive oil under high pressure, so that the shafts therein do not contact the bearings, but are supported by the oil.

In Fig. 4 there is shown a vertical transverse section through bearing 36, taken on line 4—4 of Fig. 3. In this figure there is shown three oil inlet ports 66, 68 and 70 which connect to recesses 72, 74, 76 in bearings surface 78 by passages 80, 82, 84. Oil under pressure is supplied to the inlet ports 66, 68 and 70, from whence it flows through passages 80, 82 and 84 to recesses 72, 74 and 76. The oil then passes between bearing surface 78 and shaft 28, completely supporting the latter.

Oil is drained through axial drain passage 86 and radial drain passages 88, 90 (see Fig. 3) to sump 92. Vents 94 and 96 are provided to prevent the formation of a vacuum and to permit the free flow of the oil.

A safety signal device may conveniently be installed at each bearing to warn when the shaft and bearing are in contact. As shown in Fig. 4, a simple electric circuit may comprise battery 98, light 100 and leads 102 and 104 to the shaft 28 and bearing 36, respectively. Upon contact of the shaft 28 and bearing 36, a circuit will be completed and current will be permitted to flow, with resultant lighting of light 100.

In operation, oil under pressure will be furnished to each of the bearings, where it will support the shafts out of contact with the bearings. Thus, there will be no metal to metal contact or friction, and the shafts will "float" on the oil in the bearings. Thus, the only resistance to the axial movement of the shafts in the direction of the arrows shown in Figs. 1 and 5 and hence, of the support 10 and engine mounted thereon will be small viscous forces, which are negligible. At the time that a thrust reading is taken on the appropriate measuring instrument, an inaccurate reading will be indicated by the lighting of the light 100.

Oil is used herein in a generic sense; any suitable liquid may be used.

It will be understood that the support 10 is supported at one point on bar 22 and at two points on bar 46 so that the arrangement shown provides an effective three point suspension for support 10. Hence, any distortion of the support 10 can be readily accommodated. It will also be understood that since lateral and vertical restraint is so positive, alinement of slip joints in the air supply and exhaust piping necessary for a test cell will be maintained.

Obviously many modifications and variations of the present invention are possible in the light of the above teachings. It is therefore to be understood that within the scope of the appended claims the invention may be practiced otherwise than as specifically described.

What is claimed is:

1. In an engine test stand, a main support frame having a longitudinal axis, mounting means on said frame for mounting an engine thereto, a first transverse support bar, means transferirng part of the weight of said main support frame to one part of said first transverse support bar, a set of shafts, each shaft fixed to an end of said first transverse support bar, each of said shafts having its axis parallel to the thrust axis of said engine when mounted on said main support frame, a first set of fixed hydrostatic bearings having their axes parallel to the axis of said engine, said shafts being supported in said bearings and having free movement along their axes, a second transverse support bar, means transferring the remainder of the weight of said main support frame to two parts of said second transverse support bar, a second set of shafts, each fixed to an end of said second transverse support bar, each of said second shafts having its axis parallel to the thrust axis of said engine when mounted on said main support frame, a second set of fixed hydrostatic bearings having their axes parallel to the axis of said engine, said second shafts being supported by said second set of bearings having free movement along their axes.

2. In an engine test stand, a main support frame having a longitudinal axis, mounting means on said frame for mounting an engine thereto, a first transverse support bar, one end of said frame being fixed to said support bar by one part of said bar, a set of shafts, each shaft fixed to an end of said first transverse support bar, a first set of fixed hydrostatic bearings having their axes parallel to the thrust axis of said engine, said shafts being supported in said bearings and having free movement along their axes, a second transverse support bar, the other end of said frame being fixed to two parts of said second support bar, a second set of shafts, each shaft fixed to an end of said second transverse support bar, a second set of fixed hydrostatic bearings having their axes parallel to the thrust axis of said engine, the second shafts being supported by said second set of bearings and having free movement along their axes, and means to supply liquid under pressure to each of said bearings, whereby the shafts will be supported out of contact with said bearings.

3. The apparatus according to claim 2, said hydrostatic bearings containing a non-conducting liquid together with an electric circuit comprising a source of electric energy and an incandescent lamp connected in series to one of said bearings and the shaft therein.

4. In an engine test stand, a main support comprising a rectangular frame adapted to support an engine having side members, end members and a transverse member near one end of said frame, mounting means on said frame for mounting an engine thereto, a longitudinal bar connected between said transverse member and the adjacent end member, a transverse bar fixed to said longitudinal bar, a longitudinally extending set of shafts, each shaft fixed to an end of said transverse bar, a fixed hydrostatic bearing supporting each end of each of said shafts and having its axes parallel to the thrust axis of said engine, a second transverse bar positioned near the end of the frame opposite to said transverse member, each of said side members being fixed to an end of said second transverse bar, a longitudinally extending second set of shafts, each fixed to an end of said second transverse bar, a fixed hydrostatic bearing supporting each end of each of said second shafts and having its axis parallel to the thrust axis of said engine, and means to furnish liquid under pressure to each of said bearings, whereby said shafts will be supported by said liquid out of contact with said bearings.

5. An apparatus according to claim 4, said hydrostatic bearings containing a non-conducting liquid together with an electric circuit comprising an electric energy source, an incandescent lamp connected in series to one of said shafts and a bearing in which said shaft is placed, whereby said lamp will light upon contact of said shaft with said bearing.

References Cited in the file of this patent

UNITED STATES PATENTS

| | | |
|---|---|---|
| 1,310,396 | Haskins | July 15, 1919 |
| 1,452,905 | Beehler | Apr. 24, 1923 |
| 2,498,995 | Manning | Feb. 28, 1950 |
| 2,578,712 | Martelotti | Dec. 18, 1951 |
| 2,707,392 | Metrailer | May 3, 1955 |

FOREIGN PATENTS

| | | |
|---|---|---|
| 88,470 | Austria | Nov. 15, 1921 |